J. NEFF, Jr.
CULTIVATOR.

No. 107,526. Patented Sept. 20, 1870.

Witnesses:
John L. Lewis
Charles Hothum

Inventor:
John Neff Jr.

UNITED STATES PATENT OFFICE.

JOHN NEFF, JR., OF PULTNEY, NEW YORK.

IMPROVEMENT IN CULTIVATORS.

Specification forming part of Letters Patent No. 107,526, dated September 20, 1870.

*To all whom it may concern:*

Be it known that I, JOHN NEFF, Jr., of Pultney, in the county of Steuben and State of New York, have invented certain Improvements in Cultivators, of which the following is a specification.

The first part of my invention relates to the construction of the frame that holds the several parts of my invention together.

The second part relates to making the forward tooth, pulverizing-teeth, furrow-teeth, and weed-cutters, and the method of adjusting the hind teeth.

The third part relates to the handles, and means used to support and adjust them.

Figure 1:
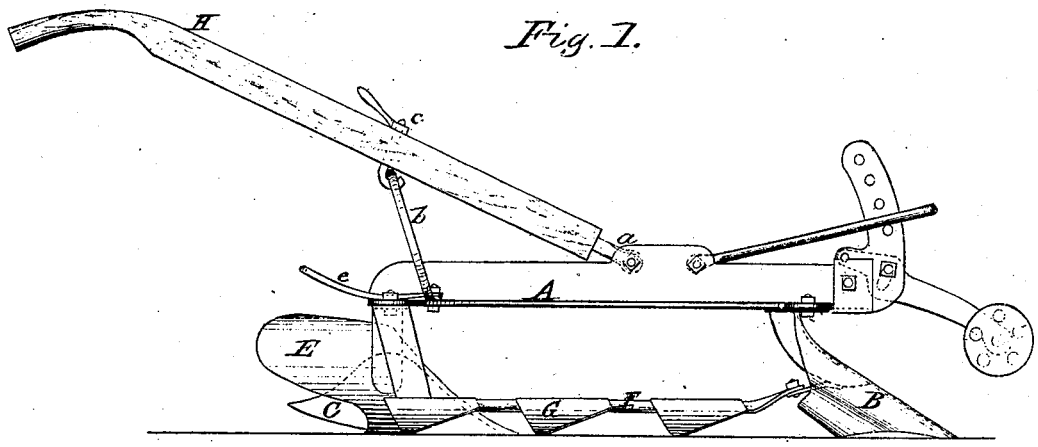
Figure 2:
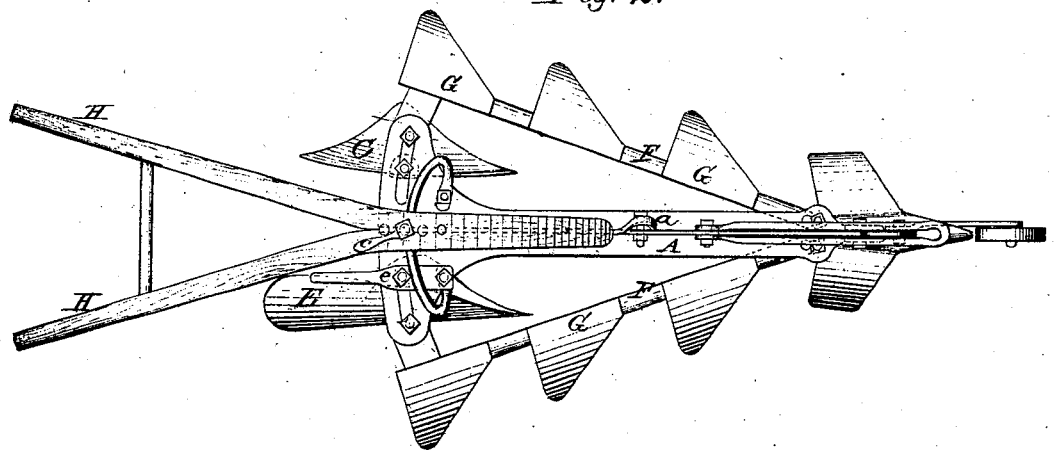
Figure 3:
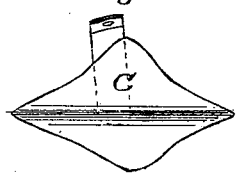
Figure 4:
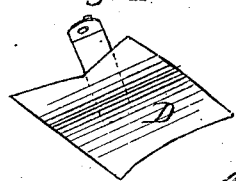

Figure 1 is a side view. Fig. 2 is a view of the weed-cutters. Fig. 3 is a side view of a double-reversible tooth. Fig. 4 is a side view of the pulverizing-tooth.

A is the frame. It is made of iron, and the lower part is shaped as shown in Figs. 1 and 2. It has elongated and curved apertures through the hind end, through which the bolts that hold the hind teeth pass through, and holes at the forward end to bolt the forward teeth. It has a bar of iron the whole length of it, attached to or made with it. This bar is situated in the middle, and vertical to the plane of the frame, and has holes through it for bolting the roller-standards, draft-bar, and the support for the lower end of the handles.

B is the forward tooth. It is made of sheet-steel. It is held in place by the ordinary kind of standard. The middle portion is raised in an angular projection that extends the whole length, and terminates in a point at the lower end, as shown in Fig. 1. It has a wing at each side, that is bent outward diagonally to the middle, and the lower and forward part of the wing must be shaped to cut on the same plane as the other teeth, and their size may be varied to suit the work intended for them to do.

C and C are the double-reversible teeth. They are made of sheet-steel, and shaped as shown in Fig. 3. They are bent in the middle of the longest part at an angle of one hundred and twenty degrees, so that when one part is held vertical the other part will present a cutting-edge to the ground, so that it may freely enter the soil. They are both made alike, and they are made to turn the furrow to the right or left by having their standards made to hold them in different positions, and when one edge is worn the other edge may be put forward, and then when worn they may be changed to the other standards, and both ends worn as before, thus making four edges to be worn before they are worn out. They are held by standards that are made one right and the other left, with their upper ends made so as to be securely bolted to the hind end of the frame A.

D is one of a pair of pulverizing-teeth. They are also made of sheet-steel, and shaped as represented in Fig. 4. They are bent cylindrically to turn a furrow, and their upper and lower edges are cut angular, as shown in the figure, to cause them to cut weeds better. They may be changed, also, when worn. They are held by standards that are made in pairs similar to the standards for the other teeth. They may be used, when it is necessary, to turn a furrow to or from the rows of trees or grape-vines, and frequently it is necessary to use one conjointly with the other teeth.

E is a tooth provided with a mold-board. It is made of sheet metal. The lower part is made similar to the lower part of the teeth C, and the upper part as the mold-board of a plow. Its use is to turn a furrow to or from corn-rows or grape-vines. All of the hind-teeth standards may be moved to the right or left by means of the lever $e$. The lever $e$ is held at the forward end by the bolt that holds the hoop $b$, and the standard-bolt passes up through it.

F and F are bars of iron. The forward ends are bolted to a projection that is made on the rear part of the standard of the forward tooth. They extend backward to the rear end of the frame, and are there held by standards similar to the standards for the teeth, and adjusted to any width in a similar manner. Their use is to support the cutters G.

G is one of a series of cutters that are used to cut weeds, between the fore and hind teeth. They are shaped as shown in Fig. 2. They are riveted to the bars F at either the upper or under side, and they are represented in Fig. 2.

H is the handles. They are made of wood, in the ordinary manner. The forward end has a piece of iron, $a$, fastened to them. This iron has a hole through the end of it that will allow it to be turned on the bolt that holds it to the frame. The handles are supported by a piece of round iron, $b$, bent as a hoop, with each end fastened to the frame, as shown in Fig. 1. They are held to the iron hoop by the hook c, that passes up through the handles, and it has a nut on the upper end. By this hoop the handles may be held to the right or left to keep them away from grape-vines or fruit-trees. There is a series of holes through the handles for the hook c, and by putting the hook in various holes the handles may be raised or lowered at will.

I claim as my invention—

The arrangement, in a cultivator, of the beam A, the bars F and F, the teeth B, C, D, and E, cutters G, handles H, parts $a$, $b$, $c$, and $e$, all constructed to operate as described.

JOHN NEFF, JR.

Witnesses:
    JOHN L. LEWIS,
    CHARLES KETCHUM.